US005699824A

United States Patent [19]

Kemmler et al.

[11] Patent Number: 5,699,824

[45] Date of Patent: Dec. 23, 1997

[54] ELECTRICAL-PNEUMATIC SYSTEM

[75] Inventors: Lothar Kemmler, Moerfelden-Walldorf; Stefan Kolbenschlag, Darmstadt, both of Germany

[73] Assignee: Samson Aktiengesellschaft, Frankfurt am Main, Germany

[21] Appl. No.: 712,518

[22] Filed: Sep. 13, 1996

[30] Foreign Application Priority Data

Sep. 14, 1995 [DE] Germany ........................ 195 34 017.5

[51] Int. Cl.$^6$ ........................ G05B 11/50

[52] U.S. Cl. ........................ 137/85; 137/82

[58] Field of Search ........................ 137/85, 82

[56] References Cited

U.S. PATENT DOCUMENTS

| | | | |
|---|---|---|---|
| 3,390,694 | 7/1968 | Rouvalis | 137/85 |
| 3,856,486 | 12/1974 | Chang | 137/85 X |
| 4,516,605 | 5/1985 | Taplin | 137/596.16 X |
| 4,617,952 | 10/1986 | Fujiwara et al. | 137/85 |
| 4,722,360 | 2/1988 | Odajima et al. | 137/85 X |
| 4,898,200 | 2/1990 | Odajima et al. | 137/85 |
| 5,370,152 | 12/1994 | Carey et al. | 137/85 X |
| 5,469,877 | 11/1995 | Askew | 137/85 |

FOREIGN PATENT DOCUMENTS 44 19 548 12/1995 Germany .

OTHER PUBLICATIONS

B. Koenig et al, "Ein intelligenter elektropneumatischer Stellungsregler", atp 31, No. 8, 1989, pp. 367–373.

M. Leufgen et al, "Pneumatischer Positionierantrieb mit Schaltventilen", *Ölhydraulik und Pneumatik*, O+P35, No. 2, 1991, pp. 127–132.

P. Tappe, "Servopneumatischer Kleinzylinderantrieb mit Schaltventilen", *Ölhydraulik und Pneumatik*, O+P39, No. 6, 1995, pp. 474–476.

*Primary Examiner*—Gerald A. Michalsky
*Attorney, Agent, or Firm*—Hill, Steadman & Simpson

[57] ABSTRACT

An electrical-pneumatic system has a controller which has an input terminal for a reference variable signal, an input terminal for a regulating variable or feedback signal and an output terminal for a manipulated variable signal, which preferably is a pulse-width modulated signal. The controller will actuate a drive unit of an electrical-pneumatic pre-control unit, which has a 3/2 directional control valve that responds to the pulse-width modulated signal from the controller. The output of the 3/2 directional control valve is smoothed by being passed through a throttle and into a volume, and a pneumatic booster is connected downstream from the volume. The output of the pneumatic booster is sensed and provides the feedback signal.

18 Claims, 2 Drawing Sheets

ELECTRICAL-PNEUMATIC SYSTEM

BACKGROUND OF THE INVENTION

The present invention is directed to an electrical-pneumatic system having, as a main unit, an electrical-pneumatic pre-control unit, a pneumatic booster and a controller having an input terminal for reference variable W, which indicates a target value, an input terminal for a regulating variable X, which indicates an actual value or feedback value, and an output terminal for a manipulated variable Y, which indicates a control value.

Electrical-pneumatic systems of this type generate a pressure at their output, which either itself represents a regulating variable or stands in an arbitrary working connection to this variable.

In general, electrical-pneumatic systems are used for controlling in various control circuits. Of particular importance is their use in position controllers for controlling the position of a throttle element, and their use for the regulation of pressure in high-precision electrical-pneumatic transducers.

For incorporation in modem process control systems in particular, it is advantageous if electrical-pneumatic systems require only a small mount of electrical power. Electrical-pneumatic systems are, likewise, used in two-wire apparatus, wherein the two-wire apparatus are driven with standardly employed unit signals between 4 mA and 20 mA, with a zero point setting of 4 mA, and, thus, with only minimal available electrical power. For driving with digital signals, general digital-analog converters are required, as an interface or already fixedly integrated, in order, for example, to control a coil current from the processor.

In the course of replacement of analog electrical technology with intelligent digital technology, digitally-driven electrical-pneumatic systems are, above all, of interest with respect to incorporation in process control systems and use in a field bus.

In order to minimize the electrical power consumption, a separation of the electrical-pneumatic pre-control unit and the pneumatic main unit is thereby usually carried out.

For digitally-operated electrical-pneumatic transducers, in particular, the use of two 2/2 directional control valves as an electrical-pneumatic pre-control unit then suggests itself, of which one switches the function "aerate or pressurize" and the other switches the function "vent or bleed".

Thus, for example, a system is known from an article by B. Koenig et al, "Ein intelligenter elektropneumatischer Stellungsregler", *Automatisierungstechnische Praxis,* atp 31, No. 8, 1989. In this system, in place of a division into pre- and main units, valves with pressure-relieved valve members are used, which are driven with pulse-width modulated signals (PWM signals).

A similar control design is described in an article by M. Leufgen et al, "Pneumatischer Positionierantrieb mit Schaltventilen", *Ölhydraulik und Pneumatik,* O+P 35, No. 2, 1991. The position of a pneumatic cylinder is thereby controlled by the PWM driving, using 2/2 directional control valves that impinge on the pneumatic cylinder from two sides with pressure, whereby the valves display a strongly non-linear characteristic.

The positioning of a pneumatic cylinder is likewise disclosed in an article by P. Tappe, "Servopneumatischer Kleinzylinderantrieb mit Schaltventilen", *Ölhydraulik und Pneumatik,* O+P 39, No. 6, 1995. Fuzzy logic is used here for controller adapting. Two 3/2 directional control valves are thereby used on both sides of the pneumatic cylinder for controlling the cylinder position, and for the driving, both an asynchronous and a pulse-width modulation drive are discussed.

The known systems comprise a number of disadvantages:

For example, they cannot be adapted to different required control pressures.

Furthermore, for the most part, two valves are used to generate the control pressure, as a result of which it has heretofore not been possible to convert the desired characteristics into a defined dependence of the control pressure on the setting signal Y. Up to now, it has not been possible to realize possibilities in new intelligent digital systems for displaying errors and changes in the control circuit.

In addition, the use of several valves causes an additional increase in costs, a high space requirement and also a high electrical power consumption.

Many of these systems are subject to strong temperature influences, making compensation measures necessary.

SUMMARY OF THE INVENTION

The object of the present invention is to further develop the general electrical-pneumatic system in such a way that it has a low electrical power requirement, shows a small temperature dependency, has a high degree of mechanical robustness and is, therefore, particularly economical with regard to space and to manufacturing costs. Moreover, this electrical-pneumatic system should be usable for different required control pressures without thereby incurring a reduction of the electronic control resolution. In addition, electrical-pneumatic systems should largely use only digital signals, without, however, being limited thereto.

These objects are obtained in an electrical-pneumatic system consisting of a main unit having a pneumatic booster, an electrical-pneumatic pre-control unit and a controller having input terminals for a reference variable W, which is indicated as a target value, an input terminal for a regulating variable X, which is indicated as an actual or feedback value, and an output terminal for a manipulated variable Y, which indicates a control value and is in the form of a pulse-width modulated signal, the electrical-pneumatic pre-control unit includes a drive unit for receiving the pulse-width modulated signal from the controller and drives a 3/2 directional control valve in response to the pulse-width modulated signal to switch the control valve mechanically between two end positions, the control valve has a second input connected to a pressure reducer means for adjusting the admission pressure at said second input, the control valve has an output which is connected to means for smoothing of the modulated pressure at the output of the 3/2 directional control valve, the means for smoothing include a volume downstream from a throttle, the downstream volume is connected to the input of the pneumatic booster for the transmission of the smooth pressure, and the output of the pneumatic booster at which the control pressure is provided is connected with an electrical measuring sensor means for determining the pressure to provide a feedback signal to the controller.

The pressure reducer means comprises a spring, whose initial force can be adjusted. The controller preferably contains a microprocessor and the terminals of the controller can receive and forward digital signals. The controller can receive analog signals and process them internally and can be formed as a P controller with a fixedly set reinforcement. The 3/2 directional control valves comprise an encapsulated construction having a pneumatic chamber, which contains a valve member of a nozzle-baffle principle and connection of the output of the control valve to the throttle, which acts as a pneumatic tap between an input lies that applies the admission pressure and the valve member operating as a baffle. The directional control valve is either a monostable design or a bistable design. The control valve is switchable by means of a changeable magnetic flux or can be piezoelectrically switchable.

The components of the electrical-pneumatic system, such as the controller, the drive unit, the directional control valve, the throttle, the volume and the pneumatic booster can be arranged in their own separate housings or the directional control valve, volume and throttle can be arranged together in an integrated construction.

Other advantages and features of the invention will be readily apparent from the following description of the preferred embodiments, the drawings and claims.

DESCRIPTION OF THE PREFERRED EMBODIMENTS

Figure 1:
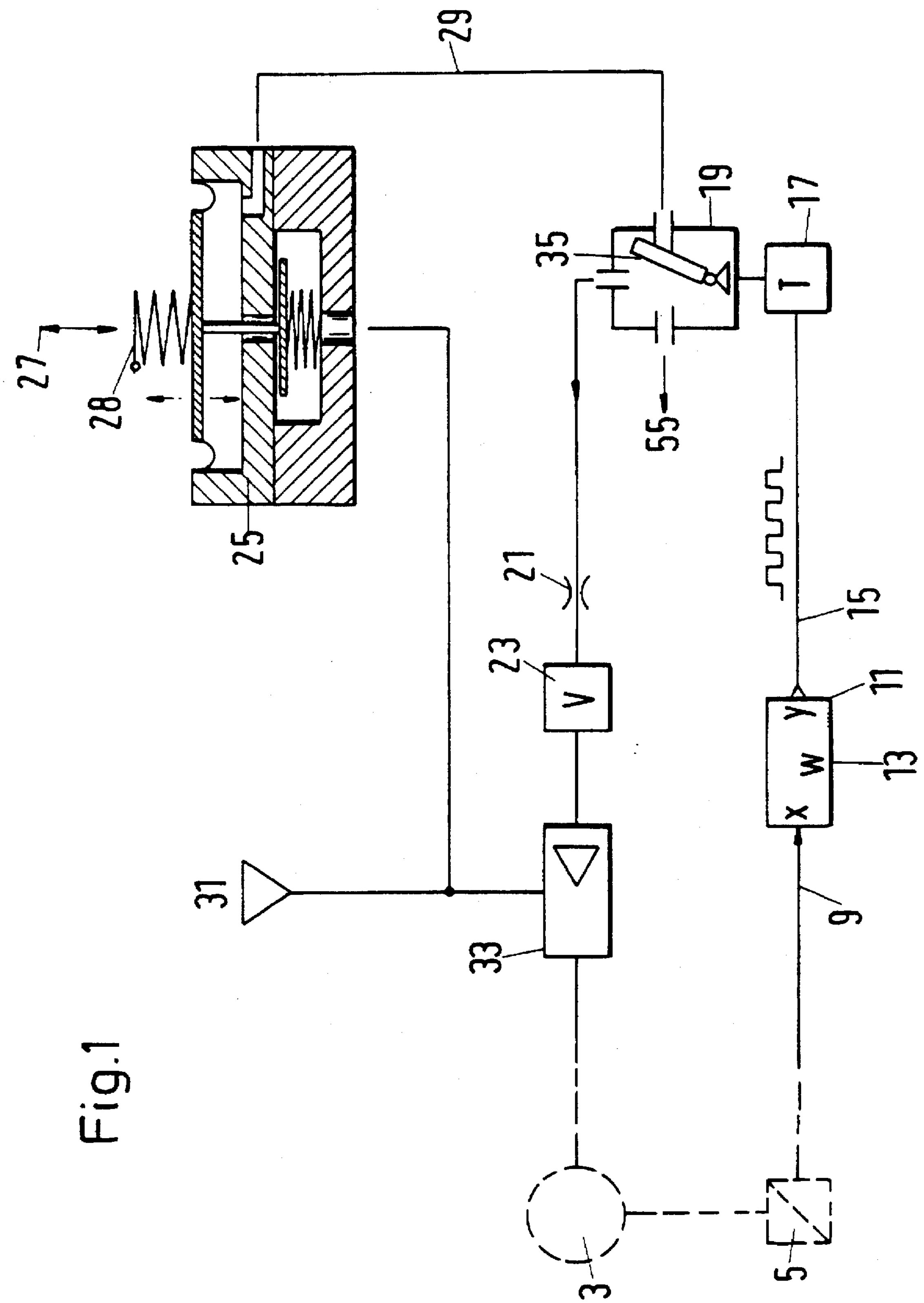
FIG. 1 is a schematic representation of an electrical-pneumatic system according to the present invention.

The principles of the present invention are particularly useful in an electrical-pneumatic system illustrated in FIG. 1. The system includes a controller 11 that has an input terminal 13 for the reference variable W, an input terminal 9 for the regulating variable X and an output terminal 15 for the manipulated variable Y. The system has an electrical-pneumatic precontrol unit, which includes a drive unit 17, a 3/2 directional control valve 19, pressure reducer means 25 and an adjustment element 27, and has a pneumatic booster 33 as part of the main unit of the system. In addition, the controller 11 in this exemplary embodiment comprises a microprocessor. The design and functioning of the electrical-pneumatic system is as follows:

The electrical measurement sensor 5 supplies the return indication or feedback signal of the regulating variable X, which is preferably present in digital form or is converted into a digital signal for the microprocessor by means of an analog/digital converter, which is not illustrated. The variable is compared with the reference variable W in the controller 11 in order to generate the manipulated variable Y as a pulse-width modulated signal, or PWM signal, that correspond to an algorithm present. This PWM signal directly drives a drive unit 17 of a 3/2 directional control valve 19 so that the valve member 35 of the 3/2 directional control valve 19 mechanically follows the PWM signal Y and causes a pressure modulation which is dependent on the admission pressure applied to the 3/2 directional control valve 19 by a line 29. The admission pressure can be set via a pressure reducer means 25 having an adjustment element 27. The admission pressure is thereby modified by the adjustment element 27 by changing the initial force or preload of the spring 28, whereby the adjusted admission pressure occurs as an equilibrium of the forces between the membrane subject to pressure and the spring 28. The modulated pressure of the 3/2 directional control valve 19 is then smoothed by means for smoothing, which include a throttle 21 and a volume 23. The smooth modulated pressure is received by the pneumatic booster 33 as a pneumatic main unit. The control pressure generated at the output 3 of the pneumatic booster 33 is finally proportionally to the, mark-space ratio of the PWM signal Y. The control pressure itself, or a quantity standing in a working connection therewith, forms the regulating variable X and is acquired with the measurement sensor 5 for the closing of the control circuit. Both the pneumatic booster 33 and the pressure reducer 25 are also connected to a pneumatic supply 31.

The connection between the pneumatic booster 33 and the controller 11 can be made in different ways according to the application. Thus, in the case of application for an electrical-pneumatic position controller for controlling a setting member, the control pressure is the pneumatic drive of a globe valve, the measurement sensor is a path sensor and the regulating variable X is the position of the valve stem. In an equally important case of application for a high-precision electrical-pneumatic transducer, the control pressure is, itself, the regulating variable X and the measurement transducer 5 is realized as a pressure sensor.

Figure 2:
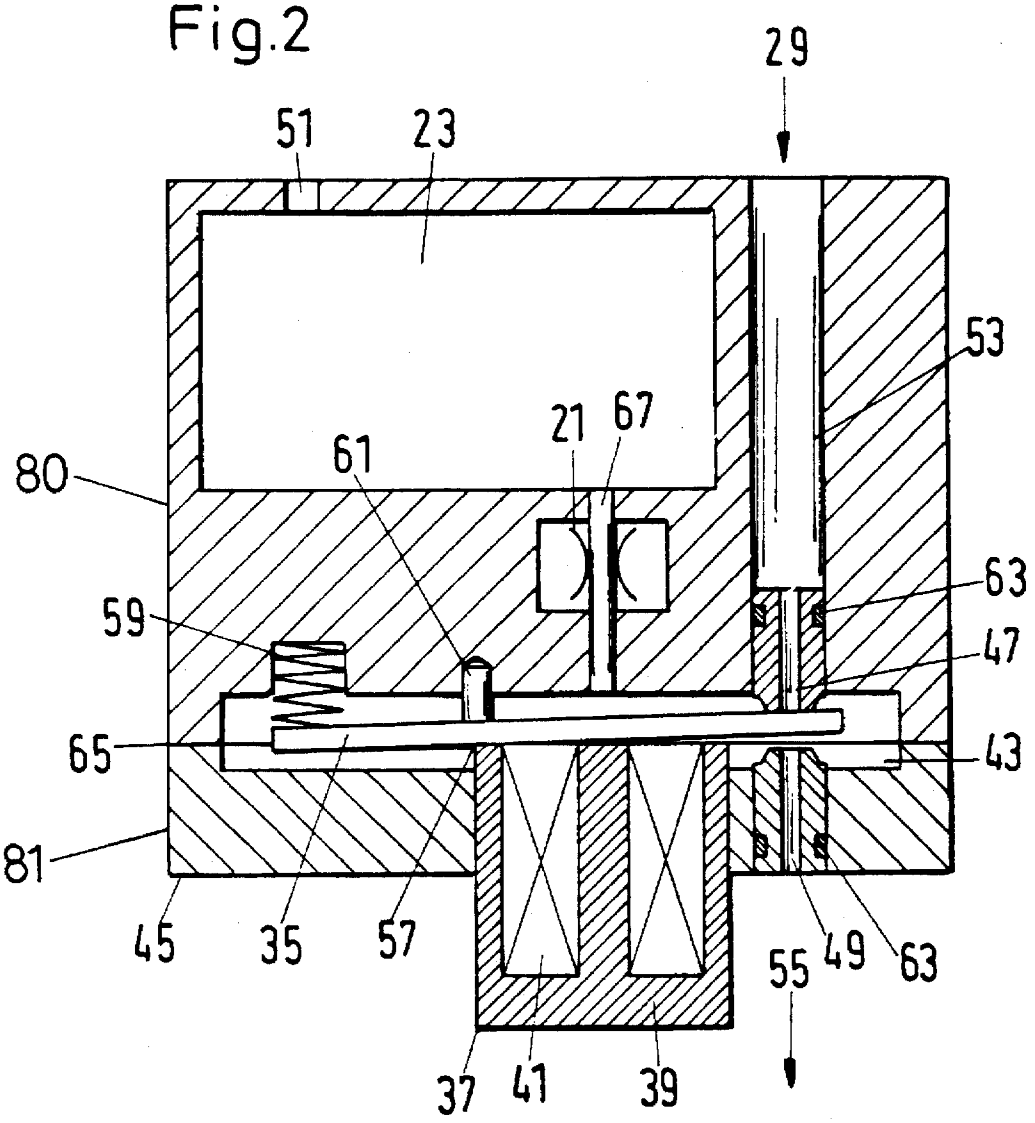
FIG. 2 is a traverse cross sectional view of a 3/2 directional control valve of an electrical-pneumatic system having a pneumatic component consisting of a throttle and a volume all integrated in a single construction.

The preferred embodiment of the 3/2 directional control valve of the electrical-pneumatic pre-control unit includes the throttle 21 and the volume 23 of the means for smoothing in an integrated construction, as illustrated in FIG. 2. Since the speed of the pneumatic components is particularly important for the quality of the controlling, the switching valve, above all, plays an important part. According to the preferred embodiment, the 3/2 directional control valve comprises, as its mechanical switching part, an electrical-pneumatic valve, which is already disclosed in U.S. patent application Ser. No. 08/602,149, filed Feb. 15, 1996, which claims priority from German Application 195 05 233.1.

The 3/2 directional control valve, as illustrated in FIG. 2, is of encapsulated construction, having a housing 45 which is formed by two housing parts 80, 81 that are joined on a plane 65 to form a pneumatic chamber 43, in which a valve member 35 can be switched by means of a changeable magnetic flux. The admission pressure present in the line 29 is applied to an inlet channel 53 terminating in an inlet nozzle 47 and an outlet 55 is connected downstream from a corresponding outlet nozzle 49. An electromagnet 37 consisting of a cup-shaped magnet yoke 39 and a coil 41 acts on the valve member 35, which is an armature.

The valve member 35 is realized in the form of a flat, rigid armature that is arranged so as to be rotationally mobile about a tilting axle 57 on the edge of the magnet 37. A spring element 59 acts on the valve member 35 to generate a torque about the tilting axle 57 so that the inlet nozzle 47 is sealed in the case in which the valve member is not attracted by the electromagnet 37. When the armature is attracted by the magnet, the outlet nozzle 49 is closed or correspondingly sealed. Both the inlet nozzle 47 and the outlet nozzle 49 are kept pressure-sealed and axially adjustable with an O-ring 63. A mechanical guide 61, which is separate from the spring element 59, prevents lateral movement of the armature or valve member 35 and enables a frictionless rotational movement of the valve member or armature 35 on the tilting axis 57, which is formed by one side of the yoke 37.

A connecting duct 67, which is a pneumatic outlet for the chamber 43 and, in the structure, extends into a volume 23 through a throttle 21. Thus, in this embodiment, the components of the 3/2 directional control valve 19, the throttle 21 and the volume 23 are integrated in a part 80 of the common housing 45.

Figure 3:
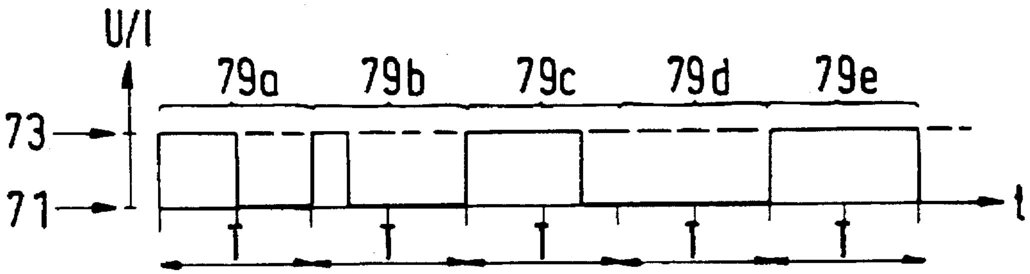
FIG. 3 is a graph showing the examples of pulse-width modulated signals of the present invention.

The pulse-width modulated signal with which the controller 11 drives the electromagnet 37 as a manipulated variable Y is illustrated in FIG. 3. The time t is plotted on the abscissa, and the electrical control variables 71 and 73 are indicated as voltage U or current I and are plotted on the ordinate, with five PWM signals 79a–79e illustrated.

The PWM signal is a digital signal Y with a state 71 for the electrical control variable "off" and a state 73 for the electrical control variable "on". These two states 71 and 73 are switched at a freely selectable, but constant, frequency or, respectively, time period T, whereby the signal information is contained in the mark-space ratio of the two variables.

During the conversion of the analog signal into a PWM signal, the quotient of the time t/T, which can be expressed as a percent value of the maximum value, corresponds to the analog signal. An on and off switching period of equal length thus corresponds to an analog signal 50%, which is shown by the signal 79a in FIG. 3. This signal pulse or group 79b signifies one which is on for 25% of the time; the signal 79c illustrates 75% on; the signal 79d illustrates 0% and the signal 79e is 100% on.

The valve member 35 follows the PWM signal in its rotational motion about the tilting axis 57 so that a modulated pressure occurs in the pneumatic chamber 43, which, via the connecting duct 67, by means of the throttle 21 and the volume 23, becomes a smoothed, analog pressure, which is applied by the output 51 to the input of the pneumatic booster 33.

By analogy with electrical technology, the throttle can be understood as an ohmic resistance, and the volume as a capacitor, so that the analogous circuit diagram would represent a lowpass filter suited for smoothing.

The range of application of the inventive electrical-pneumatic system is, however, not limited to digital systems. In an advantageous variant of the electrical-pneumatic system, the controller 11 is fashioned as an analog controller, for example, without a microprocessor. In a particularly simple embodiment, the controller 11 is a P controller with analog inputs and a fixedly set reinforcement so that a particularly simple and economical electrical-pneumatic system is created with few components. As a digital module, the controller thereby uses only the converter unit for the generation of the PWM signal.

The invention is advantageous in may respects. Above, all, the simple adaptation to different required control pressures is to be noted. In all selectable ranges, the full resolution of the PWM signal is furthermore thereby usable, so that the precision of the control does not suffer from a change in the control pressure range.

This precision, and the analog control pressure, entail the possibility of better controllers with algorithms that previously could not be realized, in particular in comparison to electrical-pneumatic systems that use two valves switched in a binary fashion.

Since the control pressure follows the PWM signal directly, a higher-frequency signal can be superposed on the actual setting signal, whereby, in the case of use as a position controller, the hysteresis of the positioner can be measured and monitored during operation. A corresponding method for monitoring an electrical-pneumatic position controller is, for example, disclosed in German Patent Application 44 19 548.6.

Furthermore, the actual existing control pressure can be inferred through the comparison of the reference variable W with the regulating variable X, which fact can be exploited to improve the controlling.

In the same way, given a known dynamic of the system, errors in the control circuit, such as leakage or a defective return indication, can also be determined.

In addition, a great advantage of the present system is the simple, direct driving by means of a PWM signal, which makes it possible to do without analog electrical signals.

The temperature dependence of the inventive electrical-pneumatic system is also minimal, since the valve member 35 of the 3/2 directional control valve 19 does not have to be maintained in a force equilibrium, but rather is constantly moved between the two end positions. The temperature thus influences only the switching time, but not the characteristic. Likewise, due to the constant motion of the valve member 35, no hysteresis, no dead zone and only a minimal drift will occur.

Since only one valve is required to realize the inventive electrical-pneumatic system, costs are saved, the construction size is reduced and the electrical power consumption is minimized.

Moreover, the inventive electrical-pneumatic system is particularly robust against mechanical disturbances, since the disturbances that are in effect only during some periods of the PWM signal can also lead to falsification only during this time. Since the period time is, however, also relatively short, the control pressure thereof is hardly influenced. In particular, since the valve member 35 is constantly constrained to follow a forced path of motion, no transient phenomena occurs, which phenomena are practically unavoidable for mechanical reasons in valves with force compensation components.

Independent of the specific embodiment, functionally associated components according to FIG. 1 can also, of course, be arranged either individually or in various combinations, respectively, in their own housing or together in an integrated construction.

Although various minor modifications may be suggested by those versed in the art, it should be understood that we wish to embody within the scope of the patent granted hereon all such modifications as reasonably and properly come within the scope of our contribution to the art.

We claim:

1. An electrical-pneumatic system consisting of a main unit having a pneumatic booster, an electrical-pneumatic pre-control unit, and a controller having an input terminal for reference variable W, which indicates a target value, an input terminal for a regulating variable X, which indicates an actual value and an output terminal for a manipulated variable Y, which indicates a control value in the form of a pulse-width modulated signal, the electrical-pneumatic pre-control unit including a drive unit for receiving the pulse-width modulated signal from the controller, a 3/2 directional control valve having a valve member switched mechanically between two end positions in response to a drive signal from the drive unit, said 3/2 directional control valve having an input connected with an adjustable pressure reducer means for adjusting the admission pressure at the input of the valve to change the pressure applied to the booster, an output connected to means for smoothing of the modulated pressure at the output of the 3/2 directional control valve, said means for smoothing including a throttle and a downstream connected volume, said pneumatic booster having an input connected downstream of the volume and an output for the control pressure, an electrical measurement sensor means for determining the output of the control pressure of the pneumatic booster and being connected to the controller to provide a feedback signal as the regulating variable X depending on the control pressure.

2. An electrical-pneumatic system according to claim 1, wherein the pressure reducer means comprises a spring having an initial preload which is adjustable.

3. An electrical-pneumatic system according to claim 1, wherein the controller contains a microprocessor and the inputs and outputs of the controller can receive and forward digital signals, respectively.

4. An electrical-pneumatic system according to claim 3, wherein the controller consists only of the microprocessor.

5. An electrical-pneumatic system according to claim 1, wherein the controller can receive analog signals as an input and can process them internally.

6. An electrical-pneumatic system according to claim 5, wherein the controller is fashioned as a P-controller with a fixedly set reinforcement.

7. An electrical-pneumatic system according to claim 1, wherein the 3/2 directional control valve has an encapsulated construction having a pneumatic chamber.

8. An electrical-pneumatic system according to claim 1, wherein the 3/2 directional control valve comprises an encapsulated construction having a valve member acting according to the nozzle baffle principle, a connection of the 3/2 directional control valve for the throttle being obtained as a pneumatic tap between a line that applies admission pressure and a valve member operating as a baffle.

9. An electrical-pneumatic system according to claim 1, wherein the 3/2 directional control valve is a monostable design.

10. An electrical-pneumatic system according to claim 1, wherein the 3/2 directional control valve is a bistable design.

11. An electrical-pneumatic system according to claim 1, wherein the 3/2 directional control valve is switchable by means of a changeable magnetic flux.

12. An electrical-pneumatic system according to claim 1, wherein the 3/2 directional control valve and the throttle and volume of the means for smoothing are contained in a single housing and said controller, the drive unit and the pneumatic booster are each in separate housings.

13. An electrical-pneumatic system according to claim 1, wherein the controller, the drive unit, the directional control valve, the throttle, the volume and the pneumatic booster are respectively arranged in separate housings.

14. An electrical-pneumatic system consisting of a main unit having a pneumatic booster, an electrical-pneumatic pre-control unit having a drive unit and being in the form of a 3/2 directional control valve, and a controller having an input terminal for a reference variable W, which indicates a target value, an input terminal for a regulating variable X, which indicates an actual value, and an output terminal for a manipulated variable Y, which indicates a control value in the form of a pulse-width modulated signal, the controller being connected to the drive unit for controlling the drive unit with a pulse-width modulated signal, the 3/2 directional control valve having a valve member switched between two end positions mechanically following the pulse-width modulated signal, the 3/2 directional control valve having another input connected to an adjustable pressure reducer means for adjusting the admission pressure at the input of the 3/2 directional control valve to adjust the pressure applied to the pneumatic booster, the 3/2 directional control valve having an output connected to means for smoothing of the modulated pressure at the output of the 3/2 directional control valve, the means for smoothing including a throttle and a downstream connected volume, the pneumatic booster having an input connected downstream of the volume, the pneumatic booster having an output for the control pressure connected to an electrical measurement sensor means, the electrical measurement sensor means being further connected to the controller to provide a feedback signal as the regulating variable X depending on the control pressure.

15. An electrical-pneumatic system according to claim 14, wherein the controller and the drive unit are contained in a single housing.

16. An electrical-pneumatic system according to claim 14, wherein the 3/2 directional control valve, the throttle and the volume of the means for smoothing are contained in a single housing.

17. An electrical-pneumatic system according to claim 14, wherein the pneumatic booster and the volume of the means for smoothing are contained in a single housing.

18. An electrical-pneumatic system according to claim 14, wherein the controller, the drive unit, the 3/2 directional control valve, the throttle of the means for smoothing and the volume of the means for smoothing, and the pneumatic booster are respectively arranged in separate housings.

* * * * *